March 10, 1925. 1,528,798
P. L. STENMAN
SPANNING COUPLE FOR LOGS AND THE LIKE
Filed May 3, 1923 2 Sheets-Sheet 1
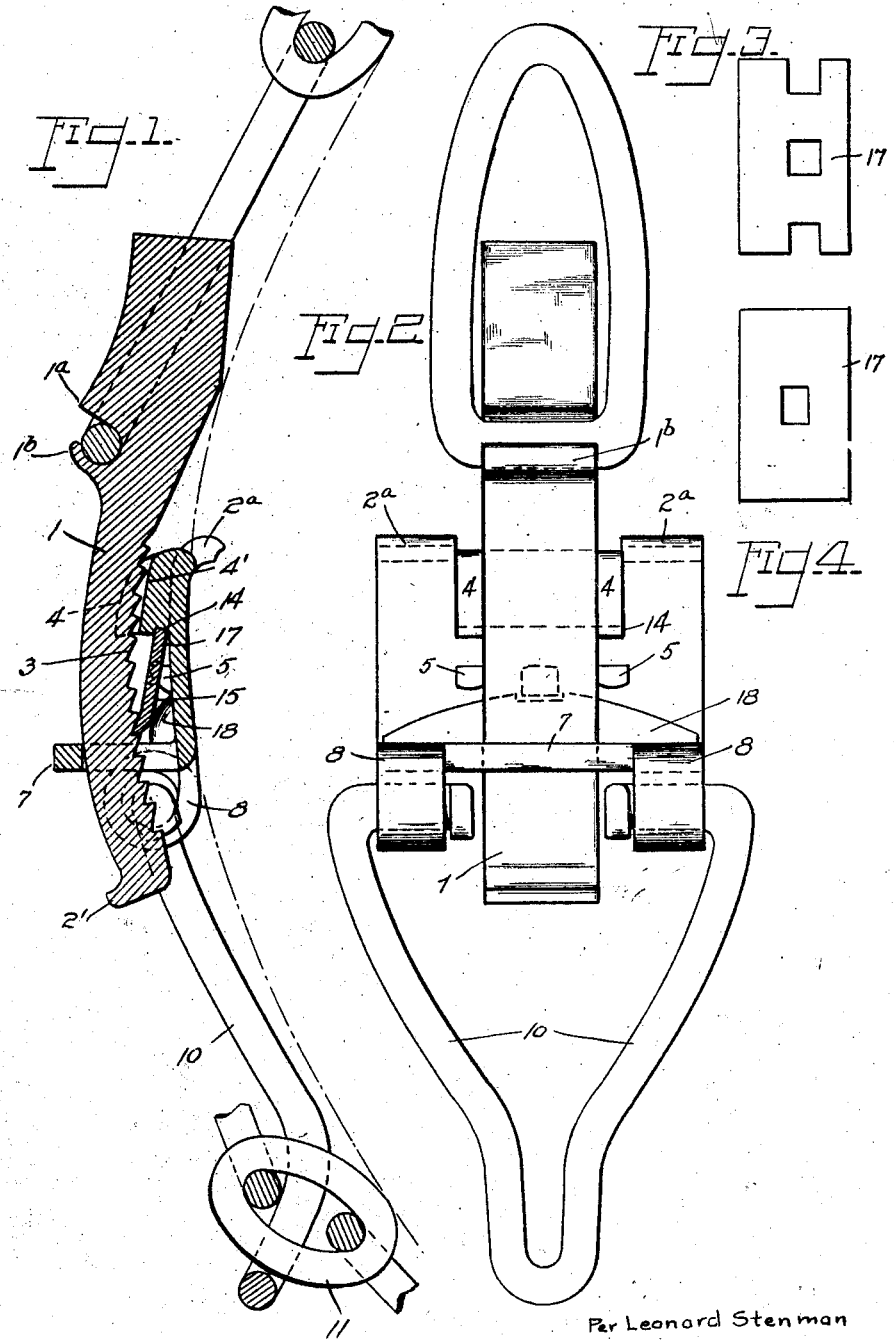
Per Leonard Stenman
Inventor
By his Attorney March 10, 1925.
P. L. STENMAN
1,528,798
SPANNING COUPLE FOR LOGS AND THE LIKE
Filed May 3, 1923          2 Sheets-Sheet 2
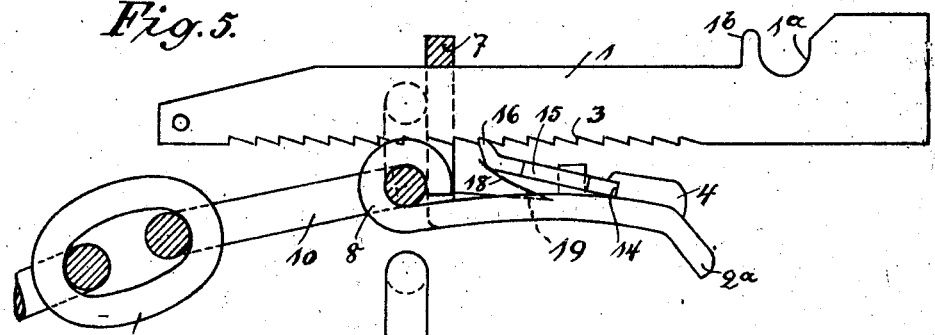
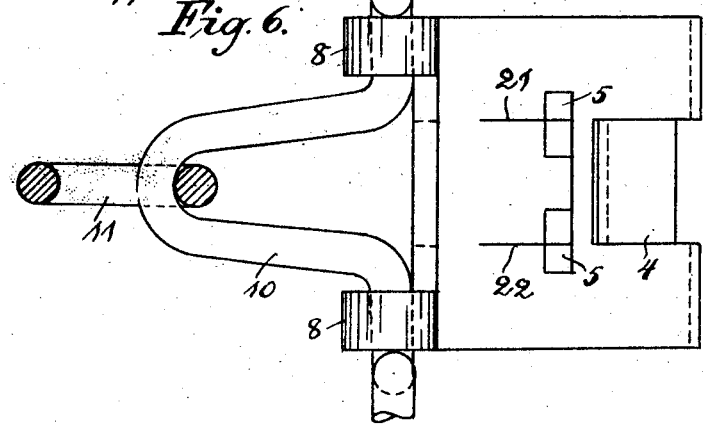
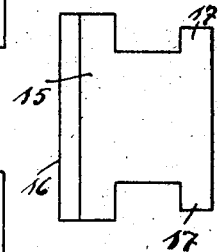
Per Leonard Stenman
INVENTOR;
By
his Attorney.

Patented Mar. 10, 1925.

1,528,798

UNITED STATES PATENT OFFICE.

PER LEONARD STENMAN, OF STOCKHOLM, SWEDEN.

SPANNING COUPLE FOR LOGS AND THE LIKE.

Application filed May 3, 1923. Serial No. 636,324.

*To all whom it may concern:*

Be it known that I, PER LEONARD STENMAN, a subject of the King of Sweden, director, residing at Stockholm, Sweden, has invented certain new and useful Improvements in Spanning Couples for Logs and the like, of which the following is a specification.

My invention relates to spanning couples, and more particularly to the type used in connection with the logging industry.

The object of my invention is to provide a means for securely holding together the opposite end portions of a chain extending around a log or binding together a group of logs. The means comprises two relatively movable parts engaging with each other by means of a set of teeth and a ratchet arrangement, these parts being attached to the ends of the chain.

In the accompanying drawings, Fig. 1 is a cross section through the center line of Fig. 2. Fig. 2 is a plan view of my device, in which the ratchet and teeth are not shown. Fig. 3 is a plan view of the ratchet member. Fig. 4 is a plan view of another form of ratchet member. Fig. 5 is a side elevation of another form of my invention. Fig. 6 is a plan view of the same, with one member omitted. Fig. 7 is a plan view of still another form of ratchet member.

Referring to Figs. 1 and 2, 1 represents a metal strap substantially rectangular in cross section and bent slightly concave. Near one end on the convex side is a transverse groove 1ª adapted to engage the end link of a chain around a log. A lip 1ᵇ is provided adjacent this groove, which lip may be hammered down after the link has been inserted, thereby insuring a firm connection between the chain and the strap. On the under or concave side of this strap are a plurality of transverse teeth 3 adapted to engage with a ratchet member 15.

This ratchet member is substantially flat and rectangular as shown in Fig. 4. The type illustrated in engagement with teeth 3 in Fig. 1 has two rectangular recesses cut out of two of its opposite edges, (as in Fig. 3), the purpose of which will be hereinafter described. One of the other two edges of this member is slightly bent and tapered so as to fit into close engagement with one of the teeth 3. The opposite edge fits into a groove 14 in member 2.

This member 2 is the other of the two relatively movable members whose mutual cooperation constitutes my invention. In plan view its shape resembles a letter H with a relatively wide transverse member. A relatively flat body portion constitutes this transverse member of the H. One edge of this body portion bends at right angles to form a loop 7 adapted to embrace the forward portion of strap 1, and to hold it substantially parallel to the member 2. The two legs of the H adjacent this loop are bent upward in the same direction as the loop 7 to form two circular eyes 8. These eyes are adapted to engage the inwardly projecting shanks of a suitably formed link member 10, substantially V-shaped. The narrowed end of this link member is adapted to engage and hold tight the other end of the chain around the log (11). The other end of the body portion of the member 2 is formed into a relatively thick channel portion on the same side as the loop 7, of which 4' is the base of the channel and the two ears 4 the sides of the channel. The strap 1 rests and moves longitudinally in this channel, the ears 4 serving to keep it in alignment. The legs of the H adjacent this channel portion are bent in the opposite direction to form sharp projections 2ª which serve to bite into the log and hold the member 2 stationary with respect thereto. At the base of the inside face of the channel portion is a transverse groove 14 adapted to receive and support the edge 17 of the ratchet member 15. This ratchet member, extending between this groove and one of the teeth on the under side of strap 1 serves in this way as a strut, keeping the strap 1 in a tight overlapped position relative to member 2.

To keep this ratchet member in engagement with the teeth, a slightly bent spring 18, transversely disposed in the right angle formed between the flat body portion of member 2 and the loop 7, exerts an upward pressure upon the under side of the ratchet member. To prevent the latter from falling out of the groove 14 when the spanning couple is loosened, projections or lugs 5 are provided on the upper face of the flat body portion of member 2. These lugs 5 are designed to engage the recesses formed in the edges of the ratchet member 15.

I prefer also to provide a third projection 5' as shown only in Fig. 2, between the two projections 5, adapted to engage a third recess in the ratchet member 15, this recess comprising a rectangular hole located between the recesses mentioned before. A ratchet member of this design is illustrated in Fig. 3. If it is desired, the two projections or lugs 5 can be dispensed with and the projection 5' used alone, in which case a ratchet member such as illustrated in Fig. 4 would be suitable. The projection 5' serves also to hold the spring 18 in position.

An upwardly turned lip 2' on the foremost edge of strap 1 serves to facilitate the inserting of strap 1 underneath the loop 7 of member 2. In operation, the strap 1 is first thus inserted and caused to overlap the member 2 as much as possible. By a series of hammer blows directed in a forward direction upon the rear end of strap 1, this overlapping will increase and the ratchet member in cooperation with the teeth will retain the members in such new overlapped position. This relative motion of members 1 and 2 will evidently tighten the grip of the chain upon the log or logs.

The spring 18 may be made V-shaped as illustrated in Figs. 5 and 6. One end rests against the base of the loop 7, the pointed edge rests in a notch or depression adjacent the stops 5 and the other end presses upward against the ratchet member 15. The depression 19 can be made of a width equal to that of the spring, so that the latter has a firm setting between the sides (21, 22) of this depression.

Figs. 5 and 6 illustrate an embodiment of my invention in which the strap 1 has not been bent but is substantially straight. The thick portion 4' of member 2 is not in the form of a channel but serves merely to limit the motion of strap 1 toward the member 2, the ears 4 being omitted. The ratchet member is illustrated separately in Fig. 7 and is substantially the same as the one illustrated in Fig. 3, except that the rectangular hole for a possible projection 5' has been omitted, and the edge 16 adapted to engage the teeth 3 has been more substantially bent upward toward these teeth. The link member 10 is also slightly different in design, the shanks thereof extending outward through the eyes 8 of the member 2 and being then bent to form two additional laterally disposed eyes adapted to engage the end links of other chains.

What I claim is—

1. A spanning couple of the character described, comprising two relatively movable members adapted to engage portions of a chain, and means for holding said members in an overlapped position, a portion of one of said members being a loop adapted to embrace the other of said members to hold said members substantially in relative position, and the end of said other member being a lip designed to facilitate the insertion and removal of said other member relative to said loop.

2. A spanning couple of the character described, comprising two relatively movable members adapted to engage portions of a chain, and means for holding said members in an overlapped position, a portion of one of said members being a loop adapted to embrace the second of said members to hold said members substantially in relative position, and another portion of said first named member being a channel the sides of which are adapted to guide the second of said members and substantially limit the motion of the latter to a relatively longitudinal direction.

3. A spanning couple of the character described, comprising two relatively movable members adapted to engage portions of a chain, and means for holding said members in an overlapped position, one of said members having outwardly disposed projections to bite into a log and hold said member stationary relative thereto.

4. A spanning couple of the character described, comprising two relatively movable members adapted to engage portions of a chain, and means for holding said members in an overlapped position, one of said members having a transverse groove and an adjacent bendable lip, said groove being adapted to engage a link of a chain, and said lip to hold said link in engagement with said groove.

5. A spanning couple of the character described, comprising two relatively movable overlying members adapted to engage portions of a chain, the first of said members having a plurality of teeth on its inner side, and a rigid strut ratchet member interposed between said member and adapted to cooperate with said teeth to hold said members in an overlapped position.

6. A spanning couple as claimed in claim 5, in which said ratchet member has at least one recess, and in which said second member has at least one lug designed to fit loosely into said recess to hold said ratchet member substantially in position when the latter is disengaged from said teeth.

7. A spanning couple, as claimed in claim 5, in which one end of said second member is a channel the sides of which are adapted to guide said first member and substantially limit the motion of the latter to a relatively longitudinal direction, and in which the other end of said second member is a loop embracing said toothed member, said channel portion having a transverse groove adapted to receive and support the unengaged end of said ratchet member.

8. A spanning couple as claimed in claim 5, including a detachable spring member adapted to hold one end of said ratchet member in engagement with said teeth.

In testimony whereof, I have signed my name to this specification in the presence of two subscribing witnesses.

PER LEONARD STENMAN.

Witnesses:
ERNST NORDLINDH,
HANS PETTERSSON.